United States Patent [19]

Bandy

[11] E Patent Number: Re. 33,044

[45] Reissued Date of Patent: Sep. 5, 1989

[54] SAILS

[75] Inventor: Stephen D. Bandy, Annapolis, Md.

[73] Assignee: Larnaston, Ltd., London, United Kingdom

[21] Appl. No.: 919,233

[22] Filed: Oct. 15, 1986

Related U.S. Patent Documents

Reissue of:

[64] Patent No.: 4,476,799
Issued: Oct. 16, 1984
Appl. No.: 428,304
Filed: Sep. 29, 1982

[51] Int. Cl.[4] ..... B63H 9/06

[52] U.S. Cl. ..... 114/103

[58] Field of Search ..... 114/102, 103, 39.1

[56] References Cited

U.S. PATENT DOCUMENTS

| | | | |
|---|---|---|---|
| 517,193 | 3/1894 | Ratsey | 114/103 |
| 2,275,159 | 3/1942 | Nye, Jr. | 114/103 |
| 2,499,598 | 3/1950 | Maurer | 114/103 |
| 2,620,760 | 12/1952 | Mielges | 114/103 |
| 3,626,886 | 12/1971 | Cofiero | 114/103 |
| 3,680,519 | 8/1972 | Jalbert | 114/103 |
| 3,903,826 | 9/1975 | Andersen | 114/103 |
| 4,593,639 | 6/1986 | Conrad | 114/103 |
| 4,708,080 | 11/1987 | Conrad | 114/103 |

FOREIGN PATENT DOCUMENTS

| | | | |
|---|---|---|---|
| 0126614 | 11/1984 | European Pat. Off. | 114/103 |
| 2501326 | 7/1976 | Fed. Rep. of Germany . | |
| 25404598 | 8/1984 | France | 114/103 |
| 892528 | 3/1962 | United Kingdom | 114/103 |

OTHER PUBLICATIONS

A Glossary of Sea Terms by Gershom Bradford Pub. Dood, Mead & Co. 1942.

Colgate, Steve, "Rudiments of Luff Tension", The Best of Sail Trim, Granada Publishing, Ltd. (1981). pp. 1215–127.

Jerome H. Milgram, "The Design and Construction of Yacht Sails", Massachusetts Institute of Technology, Cambridge, Mass., 1961, pp. 62–66.

*Primary Examiner*—Sherman D. Basinger
*Attorney, Agent, or Firm*—Lyon & Lyon

[57] ABSTRACT

This invention is an improved sail which uses wedge-shaped panels on the luff with warp threads running the length of the wedges. By properly proportioning the wedges, luff tension is distributed through the centroid of the [jib] *sail* triangle and thus controls draft position and leading edge flatness. The result is a broader wind range sail with longer optimum performance life.

19 Claims, 2 Drawing Sheets

SAILS

Matter enclosed in heavy brackets [ ] appears in the original patent but forms no part of this reissue specification; matter printed in italics indicates the additions made by reissue.

SUMMARY

This invention is a new and improved jib for use on sailing yachts. A jib is the forward-most sail, primarily used for sailing into the wind on modern yachts.

The primary achievement of this new jib is improved speed into the wind by reducing jib sail distortion. Sail distortion is less, due to the reduced dependence on headstay support in the plane of the sail.

Another object of this invention is to provide a longer-lasting sail, through the improved design which orients the strongest dimension of cloth along lines of greatest stress in the luff. Many jibs after a season of use will not work well going to windward due to luff bias breakdown.

Another object is to provide optimum performance over a greater wind speed range for any given weight of sailcloth.

Figure 1:
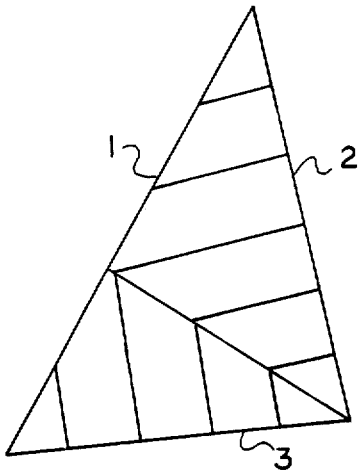
FIGURE 1 (PRIOR ART)
FIGS. 1 through 4 are examples of prior art listed in the reference section.
Figure 2:
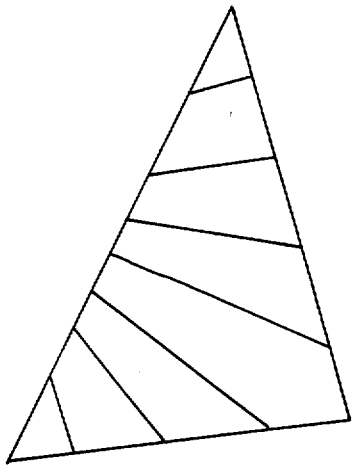
FIGURE 2 (PRIOR ART)
Figure 4:
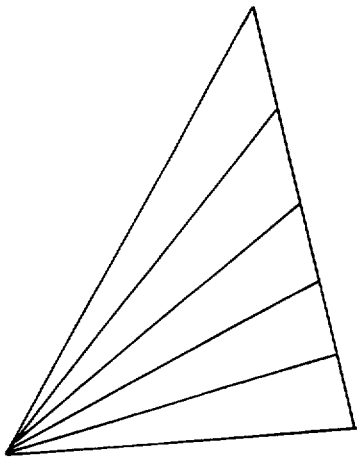
FIGURE 4 (PRIOR ART)
Figure 3:
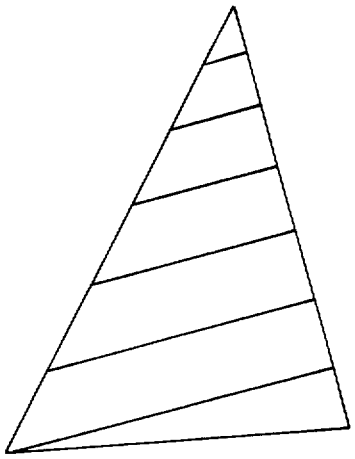
FIGURE 3 (PRIOR ART)

All figures are oriented the same with Luff (1), Leech (2), and Foot (3) so labeled in FIG. 1.

PROBLEMS OF PRIOR ART

All jibs used today attach to a high-strength metal cable or rod along their luff (1) side and are firmly attached at their head and tack corners at the ends of the luff side. The resultant wind force acting nearly through the sail centroid and nearly perpendicular to the surface pulls inward on all perimeter points of the sail and causes the luff to sag into the sail, even when attached to a taut cable. A thirty-foot luff cable with thousands of pounds of tension cannot retain a straight line and will sag many inches into the sail. It is this sag, variable with the wind velocity, which causes distortion in prior art. The sails can only be cut for one value of headstay sag.

With the development of high-strength fibers such as nylon, polyester (dacron) and now kevlar, the problems of sail-making have changed. *The warp and weft of the sail cloth are the directions of greater strength in tension of the material and therefore provide the lines of directional stability as compared to the substantially lower tension strength and stability in any bias direction of the sail material.* Warp and weft strength is, in most cases, sufficient and sails degenerate due to luff bias breakdown long before leech and foot elongation problems occur. It is proven that in racing yachts today, performance in heavier winds is improved by intentional easing of leech tension by changing the direction of sheet force, (11), shown in FIG. 5.

Luff breakdown, coupled with headstay sag, causes undesirable changes in sail draft. Attempts by the crew to restore designed-in new shape by changing luff tension usually results in further distortion and worsening windward performance.

DETAILED DESCRIPTION

Figure 5A:
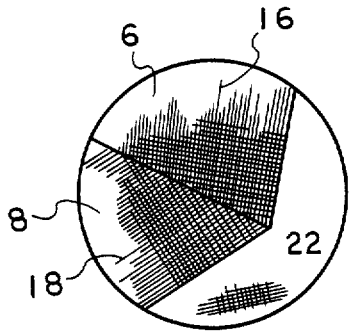
FIG. 5A is an exploded view of the sail taken at 22 of FIG. 5.
Figure 5:
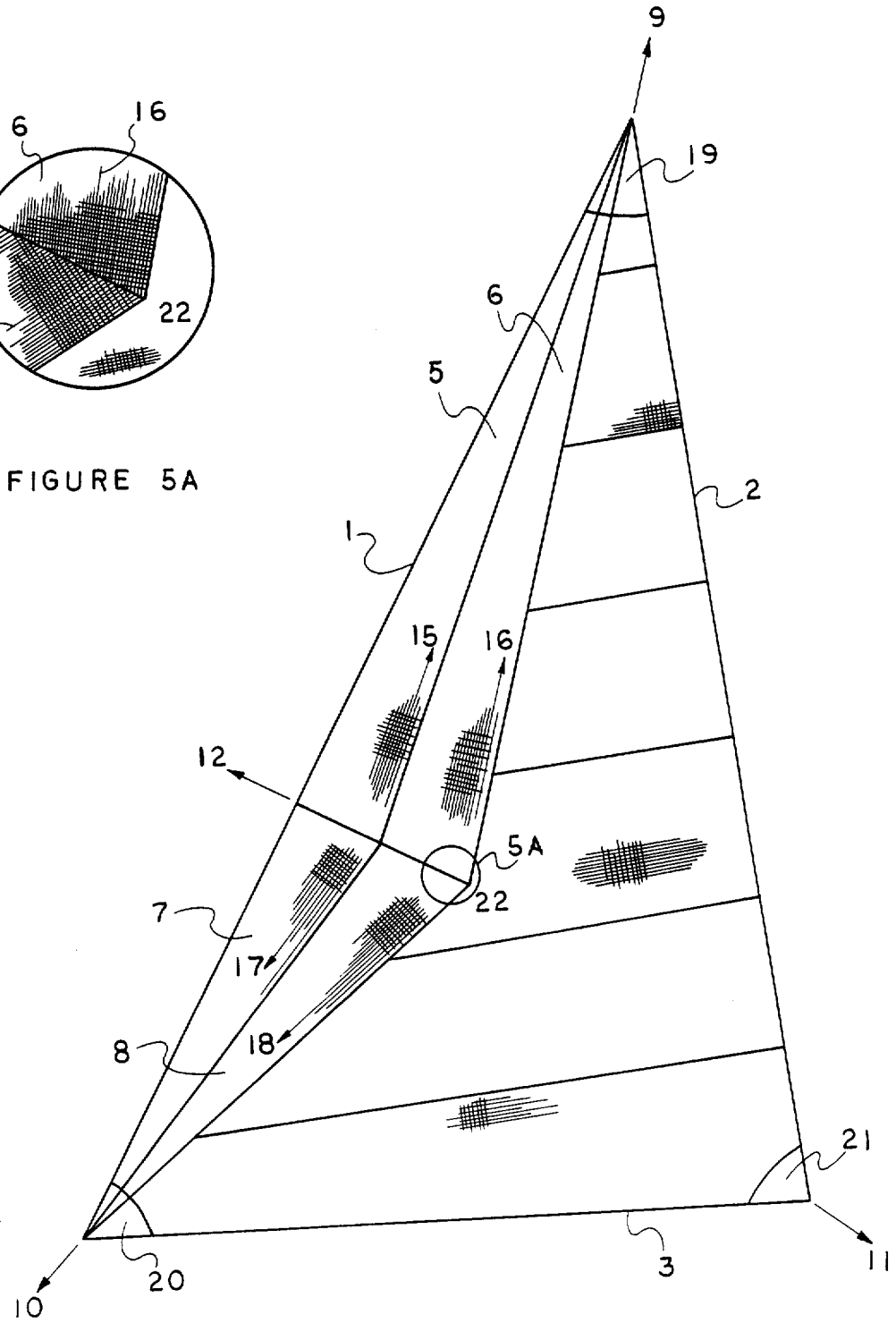
FIG. 5 is the drawings of my invention illustrating the improved luff configuration.

My invention is shown in FIG. 5 and is an improved jib sail for sailing yachts. Referring to FIG. 5, the following names and numerals of sail parts will be used in this specification and claims. 1 is the luff side *or edge* of the sail and is the leading edge, while 2 is the leech side *or edge* which is the trailing edge. The bottom side or *edge* is 3, the foot. The head corner is 19, with halyard force 9 applied, the forward lower tack corner is 20, with force 10 applied to the box, and the rear clew corner is 21, with rope sheeting force 11 applied to the deck. Sail luff is attached to a steel cable headstay, which is parallel to the luff and itself attaches firmly to bow and mast. *As used herein, luff shall mean a supported sail edge, unlike the unsupported edge of a spinnaker.* When sailing under wind stress, the force exerted on the sail luff by this cable is 12. 22 is a point near the sail centroid where the resultant wind force applies pressure perpendicular to the sail surface. The resultant wind force is the vector sum of all forces acting on the sail surface. The unique benefits of this jib are embodied in the triangular panels 5, 6, 7 and 8 which form the luff region of the sail. Four panels *of woven sail material* are shown, but more or less may be used. Within these cloth panels, warp threads are oriented along directions 15, 16, 17 and 18, respectively, *which are the lines of substantial directional stability of the sail material.*

FIG. 5A is an exploded view of warp threads 16 and 18 and weft threads within panels 6 and 8 at 22.

This new luff region extends from the luff 1 into the sail area approximately 30% of the horizontal sail arc at the widest portion. As shown in FIG. 5, the upper luff area consists of panels 5 and 6, the lower luff area contains panels 7 and 8. The seam line forming the juncture of upper luff area and lower luff area extends approximately through jib triangle centroid. This centroid is approximately ⅓ of the height of the jib up from the jib base.

Wind forces on an equivalent sail model will act through 22 and will be perpendicular to the surface. Said wind force is opposed by forces 9, 10 and 11 acting through the three corners 19, 20 and 21; it is also opposed by force 12, exerted on the luff by the headstay cable as this cable attempts to support the sail luff. With prior art the force 12 has a major influence on sail shape and is actually spread out by multiple headstay attachments. (For analysis, 12 is represented as a single force.) The stronger the sail cloth *or material in the direction along lines 15, 16, 17 and 18*, the less load will occur at 12 and the greater load will be at 9 and 10. Sides 2 and 3, the leech and foot, cannot oppose said wind force, as they are unsupported sides.

In the improved jib of FIG. 5, panels 5, 6, 7 and 8 are arranged so as to transfer wind forces directly to head 19 and tack 20 from the centroid, at or near 22, by aligning the strong warp threads 15, 16, 17 and 18 parallel to these forces *which produce lines of principle tension stress extending between the vicinity of the head corner 19 and the vicinity of the tack corner 20.* This alignment is important because warp strength is 2 to 10 times greater than bias strength *in woven cloth and for any sail material it is preferred to align the direction of maximum tension strength and stability with these lines of principle force or stress in the luff area as produced by the wind.* When panel 6 (warp threads 16) and panel 8 (warp threads 18) form a triangle 19-22-20, with 22 being the sail centroid, it can be shown analytically that headstay stresses are reduced to less than half the loads encountered with prior art sails at a given wind velocity.

The result is an improved jib, of higher strength-to-weight ratio, which distributes stresses more evenly into the sail with less distortion for a given weight of cloth per square yard than any known prior art.

Seam stitching and sail edge finishing are performed in the conventional manner. Broad-seaming, the practice of sail shaping by tapered or broadened seams, can also be applied in the conventional manner.

The first prototypes of this invention were constructed in July, 1982 and first tested on Aug. 10, 1982.

I claim:

1. An improved jib sail for a sailing yacht having a luff region extending between the head and tack of said jib sail, said luff region comprising upper and lower groups of triangular panels of woven cloth, each of said panels having an apex, a base, and a trailing edge, each of said panels further having warp threads extending substantially parallel to said trailing edge, said apex of each of said panels of said upper group convergent at the head of said jib sail and said apex of each of said panels of said lower group convergent at the tack of said jib sail, said base of each of said panels being joined along a common seamline, said seamline being substantially perpendicular to the luff of said jib sail and passing nearly through the locale of resultant wind force on said jib sail; wherein said warp threads provide maximum sail strength along a line extending from the head of said jib sail into a region near the locale of resultant wind force on said jib sail and thence to the tack of said jib sail thus producing a truss-like structure of panels transferring the wind load to the head and tack, thereby reducing the need for headstay support.

2. An improved jib sail as defined in claim 1, capable of improved windward performance over a broader wind speed range by virtue of its greater strength per given weight of sail cloth.

3. An improved jib sail as defined in claim 1, capable of improved windward performance for a longer lifetime due to its shape dependence upon threadline strength rather than cloth bias strength.

*4. A fore and aft sail having a head, a tack, a clew and a luff area along a luff edge between the head and the tack, comprising, the luff area comprised of sail material means having lines of directional stability extending between the vicinity of the head and the vicinity of the tack, at least a portion of said lines of directional stability extending away from the vicinity of the head at a small angle to the luff edge which angle faces the tack, at least a portion of said lines of directional stability extending away from the vicinity of the tack at a small angle to the luff edge which angle faces the head, and said lines of directional stability extending at said small angles for at least a portion of the distance between the head and the tack, said lines of directional stability being a direction in which the sail material means has greater resistance to deformation under tension forces than in other directions.*

*5. A sail as claimed in claim 4 wherein said lines of directional stability of the sail material means in said luff area are aligned substantially with the lines of principle stress extending between the vicinity of the head and the vicinity of the tack when the sail is under wind load and properly tensioned.*

*6. A sail as claimed in claim 5 wherein said sail material means includes a plurality of separate panels of a sail material joined together to form the luff area.*

*7. A sail as claimed in claim 6 wherein said panels are cut from a woven material having a warp and weft, and said lines of directional stability are aligned with the warp or weft.*

*8. A sail as claimed in claim 7 wherein there are at least four said panels with a pair of panels in an upper area and a pair of panels in a lower luff area, each panel being substantially triangular with first and second long sides and one short side and with the warp aligned with the first long side, and one panel of each pair having the second long side along the luff edge and the first long side joined to the second long side of the other panel of that pair.*

*9. A sail as claimed in claim 8 wherein the short side of at least one panel in the upper luff area is joined to the short side of at least one panel in the lower luff area.*

*10. A sail as claimed in claim 5 wherein said sail material means is a woven material having a warp and weft, and said lines of principle stress and directional stability are aligned with the warp or weft.*

*11. A sail as claimed in claim 4 wherein said sail material means includes a plurality of separate panels of a sail material joined together to form the luff area.*

*12. A sail as claimed in claim 11 wherein said panels are cut from a woven material having a warp and weft, and said lines of directional stability are aligned with the warp or weft.*

*13. A fore and aft sail having a head, a tack, a clew, and a luff area along a luff edge between the head and tack, comprising, the luff area comprised of sail material means having lines of directional stability in the direction of which the sail material means has substantially greater resistance to deformation under tension than in most other directions, and said lines of directional stability extending between the vicinity of the head and the vicinity of the tack with at least a substantial proportion of said lines positioned at a small angle to the luff edge, said lines of directional stability extending away from the vicinity of the head at a small angle to the luff edge which angle faces the tack and said lines of directional stability extending away from the vicinity of the tack at a small angle to the luff edge which angles faces the head.*

*14. The sail of claim 13 wherein said sail material means is comprised of a plurality of elongated panels extending generally in the direction between the head and the tack, and each panel is of a woven material having a warp and weft with the warp substantially aligned with said lines of directional stability.*

*15. A fore and aft sail having a head, a tack, a clew and a luff area along a luff edge between the head and the tack, comprising, the luff area comprised of sail material means having lines of directional stability extending between the vicinity of the head and the vicinity of the tack with at least a portion of said lines of directional stability positioned at a small angle to the luff edge for a portion of the distance between the head and the tack, said lines of directional stability being a direction in which the sail material means has greater resistance to deformation under tension forces than in other directions, said lines of directional stability of the sail material means in said luff area being aligned substantially with the lines of principle stress extending between the vicinity of the head and the vicinity of the tack when the sail is under wind load and properly tensioned, said sail material means including a plurality of separate panels of a sail material joined together to form the luff area with each of said panels being cut from a woven mate-*

*rial having a warp and weft, said lines of directional stability are aligned with the warp or weft, at least four said panels with a pair of panels in an upper area and a pair of panels in a lower luff area, each panel being substantially triangular with first and second long sides and one short side and with the warp aligned with the first long side, and one panel of each pair having the second long side along the luff edge and the first long side joined to the second long side of the other panel of that pair.*

*16. A sail as claimed in claim 15, wherein the short side of at least one panel in the upper luff area is joined to the short side of at least one panel in the lower luff area.*

*17. An improved sail for a sailing yacht having a luff region extending between the head and tack of said sail, said luff region comprising upper and lower groups of triangular panels of woven cloth, each of said panels having an appex, a base, and a trailing edge, each of said panels further having warp threads extending substantially parallel to said trailing edge, said apex of each of said panels of said upper group convergent at the head of said sail and said apex of each of said panels of said lower group convergent at the tack of said sail, said base of each of said panels being joined along a common seamline, said seamline being substantially perpendicular to the luff of said sail and passing nearly through the locale of resultant wind force on said sail; wherein said warp threads provide maximum sail strength along a line extending from the head of said sail into a region near the locale of resultant wind force on said sail and thence to the tack of said sail thus producing a truss-like structure of panels transferring the wind load to the head and tack, thereby reducing the need for headstay support.*

*18. An improved sail as defined in claim 17, capable of improved windward performance over a broader wind speed range by virtue of its greater strength per given weight of sail cloth.*

*19. An improved sail as defined in claim 17, capable of improved windward performance for a longer lifetime due to its shape dependence upon threadline strength rather than cloth bias strength.*

* * * * *